United States Patent Office 3,527,655
Patented Sept. 8, 1970

3,527,655
ADHESIVE SILICONE RUBBER
Gerald C. Ballard, Averill Park, N.Y., assignor to General Electric Company, a corporation of New York
No Drawing. Filed Aug. 9, 1968, Ser. No. 751,362
Int. Cl. B44d 1/14; C08g 47/06
U.S. Cl. 117—72                                              7 Claims

ABSTRACT OF THE DISCLOSURE

A fluid, curable silicone elastomer composition which bonds very tightly to the surfaces contacting it during cure comprises a vinyl substituted polysiloxane, an organohydrogen polysiloxane, a platinum compound catalyst, and a cohydrolyzate of vinyl trichlorosilane and vinyl triethoxysilane. The elastomer is useful in the repair of damaged silicone molds.

---

This invention relates to silicone elastomer compositions which are pourable and which are curable at moderate temperature to produce a silicone rubber which bonds strongly to the surfaces with which it is in contact during curing.

In the past, pourable silicone compositions have been known which cure to elastomers at room temperature or moderately elevated temperatures. However, any compositions heretofore known meeting these criteria based on an SiH-olefin addition type of cure system have been generally lacking in the ability to adhere to other materials. Thus, any of these compositions which have been both pourable and curable at room temperature have been so deficient in adhesion that they could not be used in such applications as repairing torn or damaged silicone molds. This lack of adhesion has tended to limit the applications of these materials to situations in which a tough, high precision cured silicone rubber was needed, such as in the making of molds for the manufacture of various parts and other applications outside of the area of high strength adhesvies.

The present invention is based on my discovery of new compositions which are pourable, which are heat curable at moderate temperatures and which adhere strongly to substrates such as glass, plastics, metals, etc. with such tenacity that the cured silicone rubber will part before the adhesive bond will fail. These compositions comprise, by weight:

(1) 100 parts of a fluid vinyl chain-stopped polysiloxane having the formula:

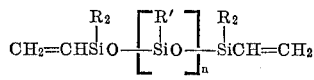

where R and R' are selected from the class consisting of lower alkyl radicals, mononuclear aryl radicals, cycloalkyl radicals having from 5 to 7 ring carbon atoms and mononuclear aryl lower alkyl radicals with at least 50 mole percent of the R' groups being methyl and where $n$ has a value sufficient to provide a viscosity of about 1,000 to 750,000 centistokes at 25° C., preferably from about 50,000 to 150,000 inclusive, (2) From 0 to 50, preferably from 20 to 50 parts of an organopolysiloxane copolymer comprising $(R'')_3SiO_{0.5}$ units, $(R'')_2SiO$ units and $SiO_2$ units, where R'' is a member selected from the class consisting of vinyl radicals and radicals selected from the class consisting of lower alkyl radicals, mononuclear aryl radicals, cycloalkyl radicals having from 5 to 7 ring carbon atoms and mononuclear aryl lower alkyl radicals, where the ratio of $(R'')_3SiO_{0.5}$ units to $SiO_2$ units is from about 0.5:1 to 1:1, and where from 2.5 to 10 mole percent of the silicon atoms contain silicon-bonded vinyl groups, (3) From 0 to 200 parts of a finely divided inorganic filler which is non-reinforcing for silicone elastomers, (4) A catalyst selected from the class consisting of platinum and platinum compound catalysts, (5) An amount of a liquid organohydrogenpolysiloxane having the formula:

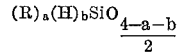

sufficient to provide from about 0.5 to 1.2 and preferably 1.0 silicon-bonded hydrogen atom per silicon-bonded vinyl group in the composition described in (1), where R is as previously defined, $a$ has a value of from 1.00 to 2.00, $b$ has a value of from about 0.1 to 1.0 and the sum of $a$ plus $b$ is from about 2.00 to 2.67, there being at least two silicon-bonded hydrogen atoms per molecule.

(6) From 0.1 to 1 part of a fluid vinyl siloxane hydrolyzate of the formula:

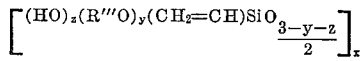

prepared by the hydrolysis of a mixture of vinyl trichlorosilane and a vinyl trialkoxysilane, such as vinyl triethoxysilane, where R''' is a lower alkyl radical having one to 8 carbon atoms, $x$ is a number greater than 3, $y$ has a value of from 0.01 to 0.4, and preferably has a value of from 0.05 to 0.1 and $z$ has a value of 0.1 to 0.4, preferably from 0.2 to 0.4, (7) From 0 percent to 85 percent, based upon the total weight of the above described mixture, of a halocarbon catalyst inhibitor selected from the class comprising halocarbons having 2 carbon atoms and at least 3 halogen substituents, said halogen substituents having an atomic weight of less than 126 positioned anywhere on the molecule.

When a completely transparent laminate is desired, the fluid vinyl siloxane hydrolyzate of (6) is not mixed into the compositions but is used to prime the transparent surfaces to be joined. The hydrolyzate is usually applied to the surfaces in an ethyl alcohol solution containing from 3 to 6 percent by weight of the hydrolyzate.

The compositions of the present invention are prepared by mixing in a suitable fashion all of the components described above plus any additional components such as will be described subsequently and maintaining the mixutre at a temperature at which it is to be cured. The compositions cure at temperatures which can vary from about 50° C. or lower to temperatures of the order of about 110° C. or higher depending upon the particular amount of platinum compound catalyst present in composition and depending upon the time which is allowed for cure. Likewise, the compositions can be prevented from curing by maintaining them at a reduced temperature such as a temperature of 0° C., in which case all of the components can be kept together for extended periods of time without curing. The compositions can also be prevented from curing by the utilization of the above described halocarbon catalyst inhibitor.

The compositions can vary from readily flowable liquids to slowly flowing liquids depending upon the viscosity of the various components employed in the reaction mixture and depending upon the amount of filler included in the reaction mixture. Regardless of the flow characteristics of the compositions of the present invention and the proportions of the various ingredients, the compositions cure to a hard, tough silicone elastomer upon maintaining the compositions at the curing temperature for the required amount of time. The compositions of the present invention are translucent or opaque and the color of the cured product is a function of the filter and any coloring agents added to the compositions. When a halocarbon inhibitor, as above described, is used in the compositions of the present invention, the viscosity of the vinyl containing fluid can be increased up to on the order of 3,000,000 centistokes and still have a readily workable material.

All of the components of the composition of the present invention are well known in the art. The vinyl chain-stopped organopolysiloxane component (1) is typified by various compositions within the scope of Formula 1 where the monovalent hydrocarbon radicals represented by R and R' include lower alkyl radicals containing from one to 8 carbon atoms, e.g., methyl, ethyl, propyl, butyl, octyl, etc. radicals; mononuclear aryl radicals e.g., phenyl, tolyl, xylyl, etc. radicals; cycloalkyl radicals containing 5 to 7 ring carbon atoms, e.g., cyclohexyl, cycloheptyl, etc. radicals, mononuclear aryl lower alkyl radicals e.g., benzyl, phenylethyl, etc. radicals.

In the preferred embodiment of the invention, all of the radicals represented by R and R' are selected from the class consisting of methyl and phenyl radicals and, in the preferred specific composition, all of the radicals represented by R and R' are methyl.

The organopolysiloxane copolymer which comprises component (2) of the compositions of this invention has been defined as including R'' groups which can be vinyl or monovalent hydrocarbon radicals free of aliphatic unsaturation, with at least the stated proportion of the R'' groups being vinyl. The R'' groups which are not vinyl are of the same scope as the R and R' groups of Formula 1 and like these groups, all of the monovalent hydrocarbon radicals free of aliphatic unsaturation are preferably methyl groups. The vinyl groups can be present either as a portion of the $(R'')_3SiO_{0.5}$ groups or of the $(R'')_2SiO$ groups or can be present in both groups.

In general the various types of siloxane units in copolymer component (2) are selected so that the ratio of the $(R'')_3SiO_{0.5}$ units to the $SiO_2$ units is between 0.5:1 and 1:1. The $(R'')_2SiO$ units are preferably present in an amount equal to from about 1 to 10 mole percent based on the total number of moles of siloxane units in the copolymer. Regardless of where the silicon-bonded vinyl groups are located in the copolymer, the silicon-bonded vinyl groups should be present in an amount equal to from about 2.5 to 10.0 mole percent of the copolymer component (2).

The copolymer component (2) is a solid resinous material and is most often available as a solution in a solvent such as xylene or toluene, generally as a 40 to 60 percent by weight solution. For ease of handling the compositions of the present invention, the solution of copolymer component (2) is usually dissolved in some or all of the vinyl chain-stopped polysiloxane component (1). The proportion of the solution of component (2) is selected so as to give the desired amount of component (2) when the solution is combined with the other components of the composition of this invention. The finely divided filler component (3) is an optional component. The function of the finely divided filler is not to reinforce the silicone elastomer and therefore reinforcing silicone fillers are generally not employed. The main function of the finely divided filler is to act as an extender for the compositions and thus reduce their cost. The effect of the filler in the compositions is generally to increase the hardness of the cured product. The finely divided inorganic fillers which comprise component (4) can include almost any type of finely divided inorganic material such as ground quartz, titanium dioxide, calcium silicate, ferric oxide, chromic oxide, calcium sulfide, glass fibers, calcium carbonate, carbon black, lithopone, talc, etc.

The platinum catalyst component (4) employed in the present invention includes all of the well known platinum catalysts which are effective for catalyzing the reaction between silicon-bonded hydrogen groups and silicon-bonded vinyl groups. These materials include the various finely divided elemental platinum catalysts such as those shown in Patent 2,970,150—Bailey, the chloroplatinic acid catalyst described in Patent 2,823,218—Speier, the platinum hydrocarbon complexes shown in Patents 3,159,601—Ashby and 3,159,662—Ashby as well as the platinum coordinate catalysts which are described in Patent 3,220,972—Lamoreaux. Regardless of the type of platinum catalyst employed, the catalyst is used in an amount sufficient to provide from about $10^{-3}$ to $10^{-6}$ gram atoms of platinum per mole of silicon-bonded vinyl groups in the composition.

The organohydrogenpolysiloxane component (5) is generally a composition of relatively simple molecular structure and is sometimes a mixture of such materials. One characteristic of the organohydrogenpolysiloxane is that it contains at least an average of two silicon-bonded hydrogen atoms per molecule. When component (2) is not present in the composition and when the hydrolyzed vinyl trialkoxysilane is used as a primer rather than a uniformly distributed component of the elastomer composition, the organohydrogenpolysiloxane contains an average of more than two silicon-bonded hydrogen atoms per molecule in order that it may function effectively as a cross-linker. One of the silicon-bonded hydrogen atoms of the molecule reacts with a silicon-bonded vinyl group of one of the components which comprise component (1) and component (2). A second silicon-bonded hydrogen atom reacts with another of such silicon-bonded groups and a third silicon-bonded hydrogen atom reacts with another of such silicon-bonded groups, etc.

One illustration of a specific organohydrogen-polysiloxane compound which can be employed in the practice of the present invention is 1,3,5,7-tetramethylcyclotetrasiloxane, which contains one silicon-bonded methyl group and one silicon-bonded hydrogen atom per silicon atom. Another illustrative material is a dimethylhydrogen chain-stopped polydimethylsiloxane containing from 2 to 3 silicone atoms in the molecule. A further type of composition is one which comprises a copolymer of dimethylsiloxane units, methylhydrogensiloxane units, and trimethylsiloxane units and which contains from 2 to 5 or 10 or more silicon atoms per molecule. A still further useful type of compound is a compound containing three dimethylhydrogensiloxane units and one monomethylsiloxane unit per molecule. Another useful material is a low viscosity fluid composed of dimethylhydrogensiloxane units and $SiO_2$ units in the ratio of 2 moles of the former to one mole of the latter. In addition to containing silicon-bonded methyl groups as illustrated in the specific compounds mentioned above, these organohydrogenpolysiloxanes can also contain a variety of other organic groups even though the preferred materials are those in which all of the R'' groups of Formula 2 are methyl. No disadvantage is found in substituting a minor portion of the methyl groups with phenyl groups.

The fluid vinyl siloxane hydrolyzate

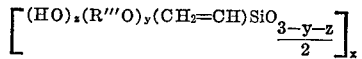

which comprises component (6) of the composition of the present invention has been defined as including R''' groups which can be lower alkyl radicals. Lower alkyl radicals represented by R''' include methyl, ethyl, propyl, butyl, octyl, etc. radicals. R''' is preferably an ethyl radical. The fluid vinyl siloxane hydrolyzate is the component of the mixture which provides the adhesive property. The fluid vinyl siloxane hydrolyzate is prepared by adding water to a hydrocarbon solution of a mixture of a vinyl trialkoxysilane, preferably vinyl triethoxysilane and vinyl trichlorosilane. The ratio of vinyl triethoxysilane to vinyl trichlorosilane on a weight basis is preferably 5 to 1, though it may vary from about 3 to 1 to 6 to 1. After hydrolysis, alcohol, water, HCl and solvent are removed first by heating at atmospheric pressure and then by vacuum stripping to produce a thick, fluid vinyl siloxane hydrolyzate. The product contains on a weight basis preferably from 3 to 5 percent alkoxy groups, preferably ethoxy groups. Other hydrolyzable silanes in small amounts can be cohydrolyzed with the hydrolyzable vinyl silane without adversely affecting the properties of the vinyl siloxane hydrolyzate product. After hydrolysis water and alcohol are removed by physical separation, then solvent is removed, first by heat then by vacuum stripping at about 80 to 90° C.

The halocarbon catalyst inhibitor component (7) is selected from the class comprising halocarbons having two carbon atoms and at least three halogen substituents. The preferred inhibitor is perchloroethylene. However, other inhibitors such as trichloroethylene and 1,2-difluoro-1,1,2,2,-tetrachloroethane are also very effective inhibitors.

The halocarbon inhibitor is removed by evaporation prior to heat cure and does not interfere with the heat curability of the compositions of the present invention. The pot life of the fluid curable silicone elastomer composition is also improved by the presence of the fluid vinyl siloxane hydrolyzate.

While the compositions of the present invention can be prepared by merely mixing the various components together in any desired fashion as previously described, it is often found most convenient to prepare these compositions in two separate portions or packages which are combined at the time the compositions are to be converted to the solid, cured, elastic state. In the case of the two package formulation, it is convenient to include in the first package the vinyl chain-stopped polysiloxane component (1), the organopolysiloxane copolymer component (2), if it is to be included in the final composition, the catalyst component (4) and some or all of the finely divided filler where a finely divided filler component (3) is employed, the fluid vinyl siloxane hydrolyzate (6) and some or all of the halocarbon inhibitor where a halocarbon inhibitor (7) is employed. The second package contains as its sole essential ingredient the organohydrogenpolysiloxane component (5), but as a matter of convenience, the second package can also contain a portion of the vinyl chain-stopped polysiloxane component (1), some or all of the vinyl siloxane hydrolyzate (6), a portion of any finely divided filler component (3) which is employed and a portion or all of any halocarbon catalyst inhibitor (7) which is employed. By adjusting the amount of vinyl chain-stopped polysiloxane fluid component (1), filler component (3), fluid vinyl siloxane hydrolyzate (6), and halocarbon catalyst inhibitor component (7) in the second package the relative proportions of the two packages required to produce the compositions of the present invention is controlled. It is preferable, however, not to include the vinyl siloxane hydrolyzate (6) in the second package as it decreases the shelf life of the second package by reacting very slowly with the organohydrogenpolysiloxane component (5).

Generally, the distribution of the components between the two packages is such that from 0.1 to 1 part by weight of the second package is employed per part of the first package. In selecting the components of the two packages, it is best not to include both the catalyst component (4) and the organohydrogenpolysiloxane component (5) in the same package.

When the two package system is employed, the two components are merely mixed in suitable fashion at the point of use and the mixture is maintained at the curing temperature until curing has been completed. Generally, complete cure can be obtained at times which vary from 8 hours at 80° C. to 10 or 20 minutes at a temperature of about 100° C. The rate of cure is a function of both the concentration of catalyst and the temperature of cure.

The details of curing the composition of the present invention depend upon the particular application. Where the compositions are to be employed for encapsulating electronic components and the like, the component is placed in a suitable container and a curable composition of the present invention is poured into the container and the container is maintained at cure temperature for the desired time. Where torn silicone parts fabricated of polyethylene filled silicon rubber are to be repaired by use of the curable compositions, the fabricated parts are coated at the tear with the curable composition of the present invention, the parts are then held in contact and the curable composition is heat cured.

When it is desired to form a transparent fabricated part of the compositions of the present invention involving adhesion to glass or transparent plastics, the fluid vinyl siloxane hydrolyzate is not mixed with the other components of the one package or two package system. Instead, a solution of the fluid vinyl siloxane hydrolyzate is used to prime the transparent surface. When the composition cures in contact with the fluid vinyl siloxane hydrolyzate primed transparent surface, an excellent bond is obtained. When the transparent compositions of the present invention are to be used as the interlayer in a polymethylmethacrylate glass laminate for aircraft windshields, the polymethylmethacrylate and glass layers are first coated with a solution of the fluid vinyl siloxane hydrolyzate. The solvent is allowed to evaporate and the curable composition is merely poured into the space between parallel spaced transparent polymethylmethacrylate and glass members and allowed to cure at an appropriate temperature, such as at a temperature in the neighborhood of 50° C.

The following examples are illustrative of the practice of the present invention and are not intended for purposes of limitation. All parts are by weight.

EXAMPLE 1

A fluid vinyl siloxane hydrolyzate was prepared by slowly adding 5200 parts of water to a flask containing 2000 parts of vinyl triethoxysilane, 1,750 parts of toluene and 400 parts of vinyl trichlorosilane. After the addition was completed, the mixture then separated into two layers. The layer containing the fluid vinyl siloxane hydrolyzate solution was transferred to a second flask. To the solution was added 42 parts of water. The solution was heated to 115° C. and solvent and water were stripped at atmospheric pressure. The solution was then cooled and filtered. After filtration the solvent was vacuum stripped from the solution at 87° C. and 21 mm. Hg. The remaining fluid vinyl siloxane hydrolyzate was a high viscosity liquid containing over 98 percent solids and an alkoxy content of 4%.

One part of the fluid vinyl siloxane hydrolyzate produced was added to 300 parts of a 100,000 centistokes dimethylvinyl chain-stopped dimethylpolysiloxane fluid and 30 parts of a copolymer containing trimethylsiloxane units, $SiO_2$ units and methylvinylsiloxane units. The various units were present in an amount sufficient to provide 0.8 trimethylsiloxane unit per $SiO_2$ unit and with the methylvinylsiloxane units being present in an amount such that 7.0 mole percent of the silicon atoms were present as a portion of methylvinylsiloxane units and the remaining silicon atoms were present as a portion of a trimethylsiloxane unit or an $SiO_2$ unit. A sufficient amount of the platinum coordinate catalyst described in Example 1 of Pat. 3,220,972—Lamoreaux was added to provide $2 \times 10^{-5}$ parts platinum per mole of silicon-bonded vinyl groups in the total composition. To the mixture was then added 6.5 parts of a dimethylvinyl chain-stopped polydimethylsiloxane fluid having a viscosity of 3500 centistokes and 6.5 parts of a 10 centistoke liquid copolymer of dimethylhydrogensiloxane units and $SiO_2$ units containing an average of 2 of the dimethylhydrogensiloxane units per $SiO_2$ unit. The final composition produced was a translucent heat vulcanizable material.

A translucent panel for a shower stall was prepared by pouring the heat vulcanizable adhesive between two sheets of polymethylmethacrylate. The laminate formed was placed in an oven and heated for 8 hours at 85° C.

A number of shower stall panels were made. Attempts to delaminate a panel resulted in fracture of the polymethylmethacrylate sheets before the bond of the sheets to the vulcanized silicone elastomer failed.

EXAMPLE 2

A self-bonding silicone rubber was prepared from one part of the fluid vinyl siloxane hydrolyzate of Example 1, 300 parts of a 100,000 centistokes dimethylvinyl chain-stopped dimethylpolysiloxane fluid, 30 parts of a copolymer containing trimethylsiloxane units, $SiO_2$ units and methylvinylsiloxane units. The various units were present in an amount sufficient to provide 0.8 trimethylsiloxane unit per $SiO_2$ unit and with the methylvinylsiloxane units being present in an amount such that 7.0 mole percent of the siloxane atoms were present as a portion of methylvinylsiloxane units and the remaining silicon atoms were present as a portion of a trimethylsiloxane unit or an $SiO_2$ unit. A sufficient amount of the platinum coordinate catalyst described in Example 1 of Pat. 3,220,972—Lamoreaux was added to provide $2 \times 10^{-5}$ parts platinum per part of silicon-bonded vinyl groups in the total composition. To the mixture was then added 6.5 parts of a dimethylvinyl chain-stopped polydimethylsiloxane fluid having a viscosity of 3500 centipoises, 6.5 parts of a 10 centistoke liquid copolymer of dimethylhydrogensiloxane units and $SiO_2$ units containing an average of two of the dimethylhydrogensiloxane units per $SiO_2$ unit and 65 parts of a finely divided quartz having an average particle size of less than about 5 microns, and 3 parts of a cobalt-based pigment to impart a blue color to the composition. The ingredients were thoroughly mixed.

A tin mold, 6 inches by 6 inches by ⅛ inch deep, was coated with a release coating of soap. A portion of the thoroughly mixed ingredients were cast into the mold and the mold was placed in an oven and heated at 100° C. for 3 hours. The mold was removed and cooled. A mixture which had been placed in the mold had cured to a tough sheet of rubber. The rubber had an elongation of over 200 percent, a tensile strength of 800 p.s.i., a tear of 93.5 pounds per inch and a Shore A hardness of 62. Other fractions of the uncured thoroughly mixed material were used to adhere glass to glass, iron to iron, copper to copper, aluminum to aluminum, glass to polymethylmethacrylate, etc. When polymethylmethacrylate formed one layer of the laminate, a cure time of 8 hours at 85° C. was used. In all other instances the cure was affected at 120° C. for 1 hour. After cure, lap shear strengths as high as 900 p.s.i. were noted. In all tests to determine the adhesive strength of the bond formed between the elastomer and the substrate, either the elastomer broke apart or the substrate broke apart before the interfacial bond between the substrate and the elastomer was damaged.

A polyethylene filled silicone rubber mold which had been badly cut was repaired by coating the surfaces to be rejoined with the self-bonding silicone rubber of this example, rejoining the surfaces, then heat curing the self-bonding silicone rubber.

The repair in no way interfered with the use of the mold, which was used in the manufacture of furniture parts.

A complex mold made of many parts of polyethylene filled silicone rubber was made by adhesively securing the parts together with the adhesive of the present example.

EXAMPLE 3

A fluid vinyl siloxane hydrolyzate solution was prepared by slowly adding 38 parts of water to a flask containing 45 grams of methyltriethoxysilane, 142.5 grams of vinyl triethoxysilane, 95.0 grams of anhydrous ethyl alcohol and 0.25 gram of vinyl trichlorosilane. The water addition took 3 minutes. The hydrolyzate was refluxed for one-half hour at 79° C. yielding a fluid vinyl siloxane hydrolyzate solution containing 25 percent solids by weight. The solution was diluted with anhydrous ethyl alcohol to a solids content of 3 percent by weight.

A windshield was made by coating a glass sheet and a polymethylmethacrylate sheet with the above described hydrolyzate solution, allowing the solvent to evaporate, then bonding the sheets together with a silicone elastomer.

The silicone elastomer was prepared by mixing 750 parts of a dimethylvinylsilyl chain-stopped polydimethylsiloxane having a viscosity of 4,000 centistokes with 250 parts of a copolymer containing trimethylsiloxane units, $SiO_2$ units and methylvinylsiloxane units. The various units were present in an amount sufficient to provide 0.8 trimethysiloxane units per $SiO_2$ unit and with the methylvinylsiloxane units being present in an amount such that 7.0 mole per cent of the silicon atoms were present as a portion of methylvinylsiloxane units and the remaining silicon atoms were present as a portion of a trimethylsiloxane unit or an $SiO_2$ unit. A sufficient amount of the platinum coordinate catalyst described in Example 1 of Patent 3,220,972—Lamoreaux was added to provide $2 \times 10^{-5}$ parts platinum per mole of silicone-bonded vinyl groups in the total composition. To the mixture was then added 50 parts of a dimethylvinyl chain-stopped dimethylsiloxane fluid having a viscosity of 3500 centistokes and 50 parts of a 10 centistoke liquid copolymer of dimethylhydrogensiloxane units and $SiO_2$ units containing an average of two of the dimethylhydrogensiloxane units per $SiO_2$ unit.

The mixture produced was a transparent liquid. The polymethylmethacrylate sheet and the glass sheet were held in fixed, parallel spaced relationship and the transparent mixture poured between the two sheets. The sheets still held in fixed, parallel spaced relationship were placed in an 85° C. oven for 8 hours. After 8 hours had passed, the temperature was slowly reduced to room temperature and the laminate windshield produced was removed from the oven. The laminate formed was extremely strong and shatterproof. The interfacial bonds between the silicone and the two sheets were so strong that it was impossible to delaminate the windshield without destroying either the glass layer or the polymehylmethacrylate layer. A number of high quality windshields were produced.

EXAMPLE 4

A self-bonding silicone rubber was prepared by mixing 11 parts of the fluid vinyl siloxane hydrolyzate of Example 1, 735 parts of a dimethyvinylsilyl chain-stopped polydimethylsiloxane having a viscosity of 4000 centistokes, 190 parts of a copolymer containing trimethylsiloxane units, $SiO_2$ units and methylvinylsiloxane units. The various units were present in an amount sufficient to provide 0.8 trimethylsiloxane units per $SiO_2$ unit and with the methylvinylsiloxane being present in an amount such that 7.0 mole percent of the silicon atoms were present as a portion of the methylvinylsiloxane units and the remaining silicon atoms were present as a portion of a trimethylsiloxane unit or an $SiO_2$ unit. A sufficient amount of the platinum coordinate catalyst described in Example 1 of Patent 3,220,972—Lamoreaux was added to provide $2 \times 10^{-5}$ parts platinum per mole of silicon-bonded vinyl groups in the total composition. To the mixture was then added 175 parts of a dimethylvinyl chain-stopped dimethylsiloxane fluid having a viscosity of 3500 centistokes and 175 parts of a 10 centistoke liquid copolymer of dimethylhydrogensiloxane units and $SiO_2$ units containing an average of two of the dimethylhydrogen units per $SiO_2$ unit, 80 parts of finely divided potassium titanate, 110 parts of very small glass spheres, 50 parts of quartz having a particle size of 5 microns, 50 grams of finely divided calcium carbonate, 30 parts of Avibest-C asbestos fibers having a diameter of 200 A. and a length of 4000 A. (the fibers are available from the Food Machinery and Chemical Corp.) and 20 parts of 1,3,5,7-tetramethyl-1,3,5,7-tetravinylcyclotetrasiloxane.

The final mixture was used to adhesively secure firewalls in place between the engine compartment and the control compartment of heavy vehicles. The mixture when cured had very high strength at high temperatures and also acted as an insulating heat shield.

While the foregoing examples have illustrated many of the embodiments of this invention, it is understood that this invention is directed broadly to a curable self-bonding composition and a method of producing the cured products thereof. The essential ingredient in the composition and the method is the fluid vinyl siloxane hydrolyzate. It is the fluid vinyl siloxane hydrolyzate which imparts self-bonding properties to the composition.

It is, of course, within the scope of the present invention to include fluid vinyl siloxane hydrolyzates containing small quantities of organic substituents other than vinyl groups. For example, when small quantities of methyl groups are present in the fluid vinyl hydrolyzate used as a primer on metal surfaces, the adhesion of the silicone rubber is improved over what is achieved using a fluid vinyl siloxane hydrolyzate as a primer. The reverse was found to be true with glass and polymethylmethacrylate.

What I claim as new and desire to secure by Letters Patent of the United States is:

1. A curable self-bonding composition comprising, by weight:
   (1) 100 parts of a fluid vinyl chain-stopped polysiloxane having the formula:

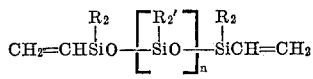

where R and R' are radicals selected from the class consisting of lower alkyl radicals, mononuclear aryl radicals, cycloalkyl radicals having from 5 to 7 ring carbon atoms and mononuclear aryl lower alkyl radicals with at least 50 mole percent of the R' groups being methyl and where $n$ has a value sufficient to provide a viscosity of about 1,000 to 750,000 centistokes at 25° C.,
   (2) from 0 to 50 parts of an organopolysiloxane copolymer comprising $(R'')_3SiO_{0.5}$ units, $(R'')_2SiO$ units and $SiO_2$ units, where $R''$ is a member selected from the class consisting of vinyl radicals and radicals selected from the class consisting of lower alkyl radicals, mononuclear aryl radicals, cycloalkyl radicals having from 5 to 7 ring carbon atoms and mononuclear aryl lower alkyl radicals, where the ratio of $(R'')_3SiO_{0.5}$ units to $SiO_2$ units is from about 0.5:1 to 1:1, and where from 2.5 to 10 mole percent of the silicon atoms contain silicon-bonded vinyl groups,
   (3) from 0 to 200 parts of a finely divided inorganic filler which is non-reinforcing for silicone elastomers,
   (4) a catalyst selected from the class consisting of platinum and platinum compound catalysts,
   (5) an amount of a liquid organohydrogenpolysiloxane having the formula:

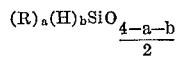

sufficient to provide from about 0.5 to 1.2 silicon-bonded hydrogen atom per silicon-bonded vinyl group in the composition described in (1), where R is as previously defined, $a$ has a value of from 1.00 to 2.00, $b$ has a value of from about 0.1 to 1.2 and the sum of $a$ plus $b$ is from about 2.00 to 2.67, there being at least two silicon-bonded hydrogen atoms per molecule.
   (6) from 0.1 to 1 part of a fluid vinyl siloxane hydrolyzate of the formula:

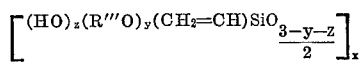

where $R'''$ is a lower alkyl radical, $x$ is a number greater than 3, $y$ has a value of from 0.01 to 0.4 and $z$ has a value of 0.1 to 0.4,
   (7) from 0 percent to 85 percent, based upon the total weight of the above described mixture, of a halocarbon catalyst inhibitor selected from the class comprising halocarbons having 2 carbon atoms and at least 3 halogen substituents, said halogen substituents having an atomic weight of less than 126 and positioned anywhere on the molecule.

2. The composition of claim 1 wherein $y$ has a value of from 0.05 to 0.1 and $z$ has a value of 0.2 to 0.4.

3. A method of forming a composite comprising silicone rubber bonded to a substrate which comprises coating the substrate with a fluid vinyl siloxane hydrolyzate of the formula:

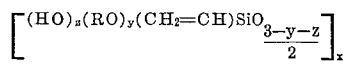

where $R'''$ is a lower alkyl radical, $x$ has a value greater than 3 and $y$ has a value of 0.01 to 0.4, and $z$ has a value of 0.1 to 0.4, then applying a curable silicone elastomer composition, said silicone composition consisting of:
   (1) 100 parts of a fluid vinyl chain-stopped polysiloxane having the formula:

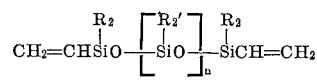

where R and R' are radicals selected from the class consisting of lower alkyl radicals, mononuclear aryl radicals, cycloalkyl radicals having from 5 to 7 ring carbon atoms and mononuclear aryl lower alkyl radicals with at least 50 mole percent of the R' groups being methyl and where $n$ has a value sufficient to provide a viscosity of about 1,000 to 750,000 centistokes at 25° C.,
   (2) from 0 to 50 parts of an organopolysiloxane copolymer comprising $(R'')_3SiO_{0.5}$ units, $(R'')_2SiO$ units and $SiO_2$ units, where $R''$ is a member selected from the class consisting of vinyl radicals and radicals selected from the class consisting of lower alkyl radicals, mononuclear aryl radicals, cycloalkyl radicals having from 5 to 7 ring carbon atoms and mononuclear aryl lower alkyl radicals, where the ratio of $(R'')_3SiO_{0.5}$ units to $SiO_2$ units is from about 0.5:1 to 1:1, and where from 2.5 to 10 mole percent of the silicon atoms contain silicon-bonded vinyl groups,
   (3) from 0 to 200 parts of a finely divided inorganic filler which is non-reinforcing for silicon elastomers,
   (4) a catalyst, selected from the class of platinum and platinum compound catalysts,
   (5) an amount of a liquid organohydrogenpolysiloxane having the formula:

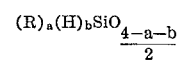

sufficient to provide from about 0.5 to 1.2 silicon-bonded hydrogen atoms per silicon-bonded vinyl group in the composition described in (1), where R is as previously defined, $a$ has a value of from 1.00 to 2.10, $b$ has a value of from about 0.1 to 1.0 and the sum of $a$ plus $b$ is from about 2.00 to 2.67, there being at least two silicon-bonded hydrogen atoms per molecule,
   (6) from 0 percent to 85 percent, based upon the total weight of the above described mixture, of a halocarbon catalyst inhibitor selected from the class comprising halocarbons having 2 carbon atoms and at least 3 halogen substituents, said substituents having an atomic weight of less than 126 and positioned anywhere on the molecule.

4. A composition to be used in a self-bonding silicone rubber, comprising by weight,
   (1) from 0 to 200 parts of a finely divided inorganic filler which is non-reinforcing for silicon elastomers, (2) an amount of a liquid organohydrogenpolysiloxane having the formula:

$$(R)_a(H)_b SiO_{\frac{4-a-b}{2}}$$

sufficient to provide from about 0.5 to 1.0 silicon-bonded hydrogen atom per silicon-bonded vinyl group in the composition described in (1), where R is as previously defined, $a$ has a value of from 1.00 to 2.00, $b$ has a value of from about 0.1 to 1.2 and the sum of $a$ plus $b$ is from about 2.00 to 2.67, there being at least two silicon-bonded hydrogen atoms per molecule, (3) from 0.1 to 1 part of a fluid vinyl siloxane hydrolyzate of the formula:

$$\left[(HO)_z(R'''O)_y(CH_2=CH)SiO_{\frac{3-a-b}{2}}\right]_x$$

where R''' is a lower alkyl radical, $x$ is a number greater than 3, $y$ has a value of from 0.01 to 0.4 and $z$ has a value of 0.1 to 0.4, (4) from 0 percent to 85 percent, based upon the total weight of the above described mixture, of a halocarbon catalyst inhibitor selected from the class comprising halocarbons having 2 carbon atoms and at least 3 halogen substituents, said halogen substituents having an atomic weight of less than 126 and positioned anywhere on the molecule.

5. The composition of claim 4 wherein $y$ has a value of 0.05 to 0.1 and $z$ has a value of 0.2 to 0.4.

6. A composition to be used in a self-bonding silicone rubber, comprising by weight:

(1) 100 parts of a fluid vinyl chain-stopped polysiloxane having the formula:

$$CH_2=CH\underset{R_2}{\overset{R_2}{Si}}O-\left[\underset{R_2'}{\overset{R_2'}{Si}}O\right]_n-\underset{R_2}{\overset{R_2}{Si}}CH=CH_2$$

where R and R' are radicals selected from the class consisting of lower alkyl radicals, mononuclear aryl radicals, cycloalkyl radicals having from 5 to 7 ring carbon atoms and mononuclear aryl lower alkyl radicals with at least 50 mole percent of the R' groups being methyl and where $n$ has a value sufficient to provide a viscosity of about 1,000 to 750,000 centistokes at 25° C., (2) from 0 to 50 parts of an organopolysiloxane copolymer comprising $(R'')_3SiO_{0.5}$ units, $(R'')_2SiO$ units and $SiO_2$ units, where R'' is a member selected from the class consisting of vinyl radicals and radicals selected from the class consisting of lower alkyl radicals, mononuclear aryl radicals, cycloalkyl radicals having from 5 to 7 ring carbon atoms and mononuclear aryl lower alkyl radicals, where the ratio of $(R'')_3SiO_{0.5}$ units to $SiO_2$ units is from about 0.5:1 to 1:1, and where from 2.5 to 10 mole percent of the silicon atoms contain silicon-bonded vinyl groups, (3) from 0 to 200 parts of a finely divided inorganic filler which is non-reinforcing for silicone elastomers, (4) a catalyst selected from the class consisting of platinum and platinum compound catalysts, (5) from 0.1 to 1 part of a fluid vinyl siloxane hydrolyzate of the formula:

$$\left[(HO)_z(R'''O)_y(CH_2=CH)SiO_{\frac{3-y-z}{2}}\right]_x$$

where R''' is a lower alkyl radical, $x$ is a number greater than 3, $y$ has a value of from 0.01 to 0.4 and $z$ has a value of 0.1 to 0.4, (6) from 0 percent to 85 percent, based upon the total weight of the above described mixture, of a halocarbon catalyst inhibitor selected from the class comprising halocarbons having 2 carbon atoms and at least 3 halogen substituents, said halogen substituents having an atomic weight of less than 126 and positioned anywhere on the molecule.

7. The composition of claim 6 wherein $y$ has a value of 0.05 to 0.1 and $z$ has a value of 0.2 to 0.4.

References Cited

UNITED STATES PATENTS

| | | | |
|---|---|---|---|
| 3,324,079 | 6/1967 | Spalding | 260—46.5 |
| 3,383,356 | 5/1968 | Nielsen | 260—46.5 |
| 3,436,366 | 4/1969 | Modic | 260—825 |

SAMUEL H. BLECH, Primary Examiner

U.S. Cl. X.R.

117—2, 124, 132, 138.8, 161; 161—193, 207, 208; 260—37, 46.5, 448.2, 825